(12) United States Patent
Naka

(10) Patent No.: US 8,355,053 B2
(45) Date of Patent: Jan. 15, 2013

(54) IMAGE PICKUP APPARATUS AND CONTROL METHOD THEREFOR

(75) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 12/691,606

(22) Filed: Jan. 21, 2010

(65) Prior Publication Data

US 2010/0194924 A1    Aug. 5, 2010

(30) Foreign Application Priority Data

Jan. 30, 2009  (JP) ................................ 2009-020741
Dec. 22, 2009  (JP) ................................ 2009-291407

(51) Int. Cl.
  *H04N 5/228* (2006.01)
  *H04N 9/68* (2006.01)
(52) U.S. Cl. ............... 348/208.5; 348/234; 348/208.12; 348/208.15; 348/208.16
(58) Field of Classification Search ................ 348/234, 348/208.12, 208.5, 208.1, 208.15, 208.16
See application file for complete search history.

(56) References Cited

U.S. PATENT DOCUMENTS

| 6,167,200 | A | 12/2000 | Yamaguchi et al. |
| 2003/0007076 | A1 | 1/2003 | Pkisu et al. |
| 2005/0052537 | A1 | 3/2005 | Mizusawa |
| 2007/0172217 | A1 | 7/2007 | Toji |
| 2009/0207281 | A1* | 8/2009 | Ono ............................. 348/234 |
| 2010/0020191 | A1* | 1/2010 | Sugimoto ................. 348/222.1 |
| 2010/0026836 | A1* | 2/2010 | Sugimoto ................. 348/223.1 |
| 2010/0123815 | A1* | 5/2010 | Yim et al. ................ 348/333.02 |

FOREIGN PATENT DOCUMENTS

| JP | 2000-075351 | 3/2000 |
| JP | 2002-251380 | 9/2002 |

OTHER PUBLICATIONS

The above references were cited in a Search Report issued on May 11, 2010, concerning the corresponding European Patent Application No. 10151598.9.

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

Effects due to user operation are reduced in scene discrimination. In an image pickup apparatus, when performing scene discrimination based on information that includes detected movement of a subject and vibration of the image pickup apparatus, and an picked up image, the degree to which one of the movement of the subject and the vibration of the image pickup apparatus while an operating instruction is being received from a user contributes to scene discrimination is restricted.

6 Claims, 6 Drawing Sheets

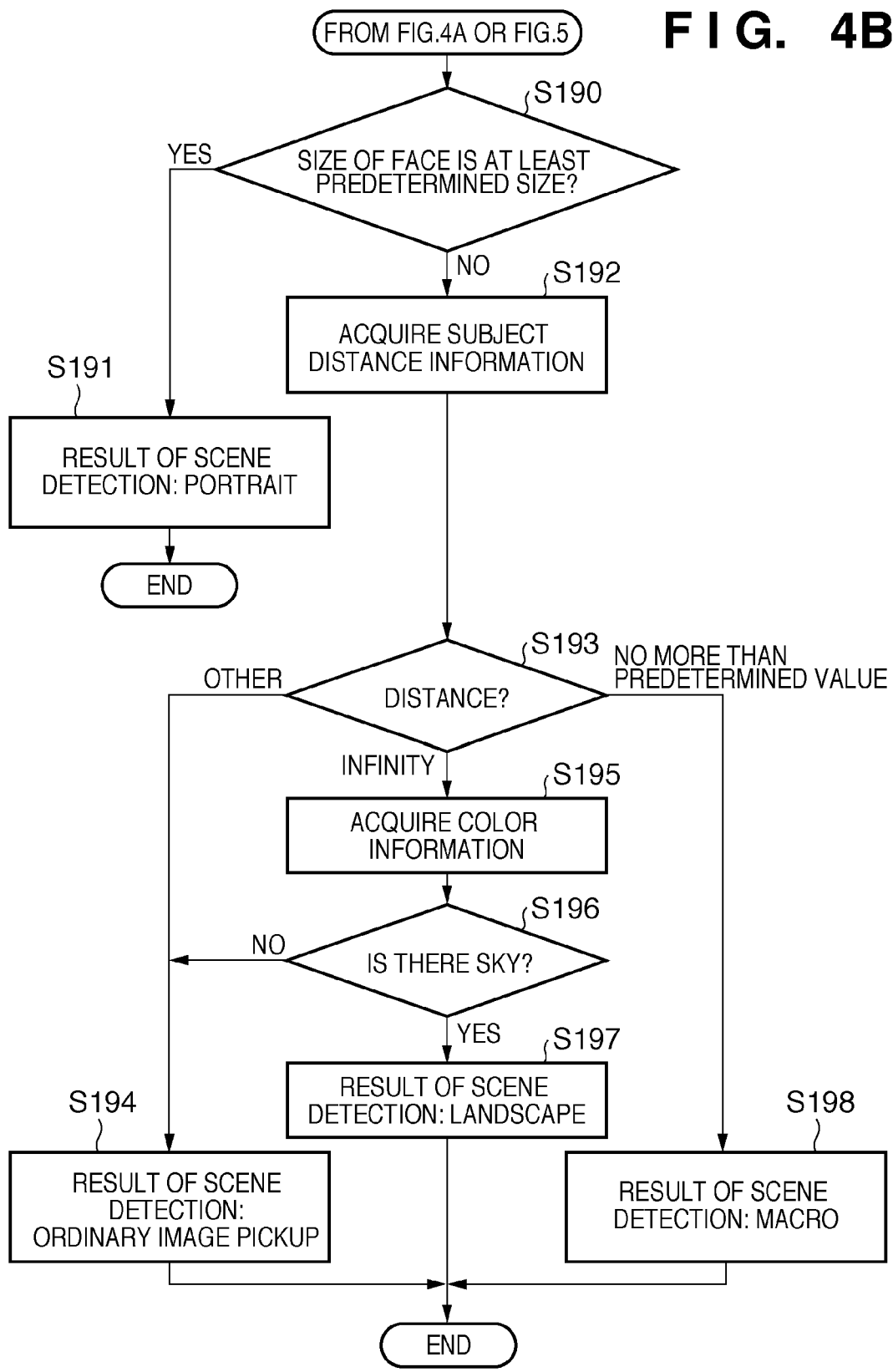

IMAGE PICKUP APPARATUS AND CONTROL METHOD THEREFOR

BACKGROUND OF THE INVENTION

1. Field of the Invention

The present invention relates to an image pickup apparatus and a control method for that image pickup apparatus.

2. Description of the Related Art

Recently, among image pickup apparatuses such as digital still cameras, there are apparatuses that discriminate an image pickup scene using various information such as image pickup data and information about movement of the apparatus body, and perform image pickup with optimal image pickup conditions according to the discriminated scene (see Japanese Patent Laid-Open No. 2000-75351). Scene discrimination may also be known as automatic shooting mode selection.

However, with the above conventional technology, effects due to user operation are included in the information used for scene discrimination, so there is a decrease in the reliability of scene discrimination. For example, there may be instances when hand shake information varies due to button operation by the user, and so the image pickup apparatus is discriminated to be in a hand-held image pickup mode even though the image pickup apparatus is fixed to a tripod. Also, there may be instances when movement vector information varies due to variation in the angle of view due to a zoom operation, and so the image pickup apparatus is discriminated to be in a sports mode even though the scene is one in which image pickup of a still subject is performed.

SUMMARY OF THE INVENTION

The present invention was made in consideration of such problems in the conventional technology. It is desirable to provide an image pickup apparatus capable of reducing effects due to user operation in scene discrimination, and a control method for that image pickup apparatus.

The present invention in its first aspect provides an image pickup apparatus, comprising: an image pickup unit configured to pick up an image of a subject; a detection unit that comprises at least one of a movement detection unit that detects movement of the subject from images that have been picked up by the image pickup unit and a vibration detection unit that detects vibration of the image pickup apparatus; a scene discrimination unit configured to perform scene discrimination based on: information that includes the results of detection by the detection unit, and an image that has been picked up by the image pickup unit; and an operating unit configured to receive an operating instruction from a user; wherein the scene discrimination unit is configured to restrict the degree to which the results output by the detection unit contribute to the scene discrimination while the operating instruction is being received.

The present invention in its second aspect provides an image pickup apparatus, comprising: an image pickup unit configured to pick up an image of a subject; a detection unit that comprises at least one of a movement detection unit for detecting movement of the subject from images that have been picked up by the image pickup unit and a vibration detection unit for detecting vibration of the image pickup apparatus; a scene discrimination unit configured to perform scene discrimination based on information that includes the results of detection by the detection unit, and an image that has been picked up by the image pickup unit; and an operating unit configured to receive an operating instruction from a user; wherein when the operating unit has received an operating instruction, the scene discrimination unit is configured to perform the scene discrimination, but the detection unit is configured not to detect at least one of movement of the subject and vibration of the image pickup apparatus.

The present invention in its third aspect provides a method for controlling an image pickup apparatus having an image pickup unit that picks up an image of a subject and an operating unit that receives an operating instruction from a user, the method comprising: a detection step that comprises at least one of a movement detection step of detecting movement of the subject from images that have been picked up by the image pickup unit and a vibration detection step of detecting vibration of the image pickup apparatus; and a scene discrimination step of performing scene discrimination based on information that includes the results of detection from the detection step, and an image that has been picked up by the image pickup unit; wherein the scene discrimination step comprises restricting the degree to which the results of detection of the detection step contribute to the scene discrimination while the operating instruction is being received.

The present invention in its fourth aspect provides a method for controlling an image pickup apparatus having an image pickup unit that picks up an image of a subject and an operating unit that receives an operating instruction from a user, the method comprising: a detection step that comprises at least one of a movement detection step of detecting movement of the subject from images that have been picked up by the image pickup unit and a vibration detection step of detecting vibration of the image pickup apparatus; and a scene discrimination step of performing scene discrimination based on information that includes the results of detection from the detection step, and an image that has been picked up by the image pickup unit; wherein when the operating instruction has been received, scene discrimination is performed in the scene discrimination step, but at least one of movement of the subject and vibration of the image pickup apparatus is not detected in the detection step.

According to the present invention, it is desirable to reduce effects due to user operation in scene discrimination.

Further features of the present invention will become apparent from the following description of exemplary embodiments with reference to the attached drawings.

BRIEF DESCRIPTION OF THE DRAWINGS

FIGS. 4A and 4B are flowcharts that show an algorithm of scene discrimination processing.

DESCRIPTION OF THE EMBODIMENTS

The following is a description of an embodiment of the invention with reference to the attached drawings, but the invention is not limited by the below embodiment. This embodiment of the invention is merely a possible embodiment of the invention, and does not limit the scope of the invention.

Figure 1:
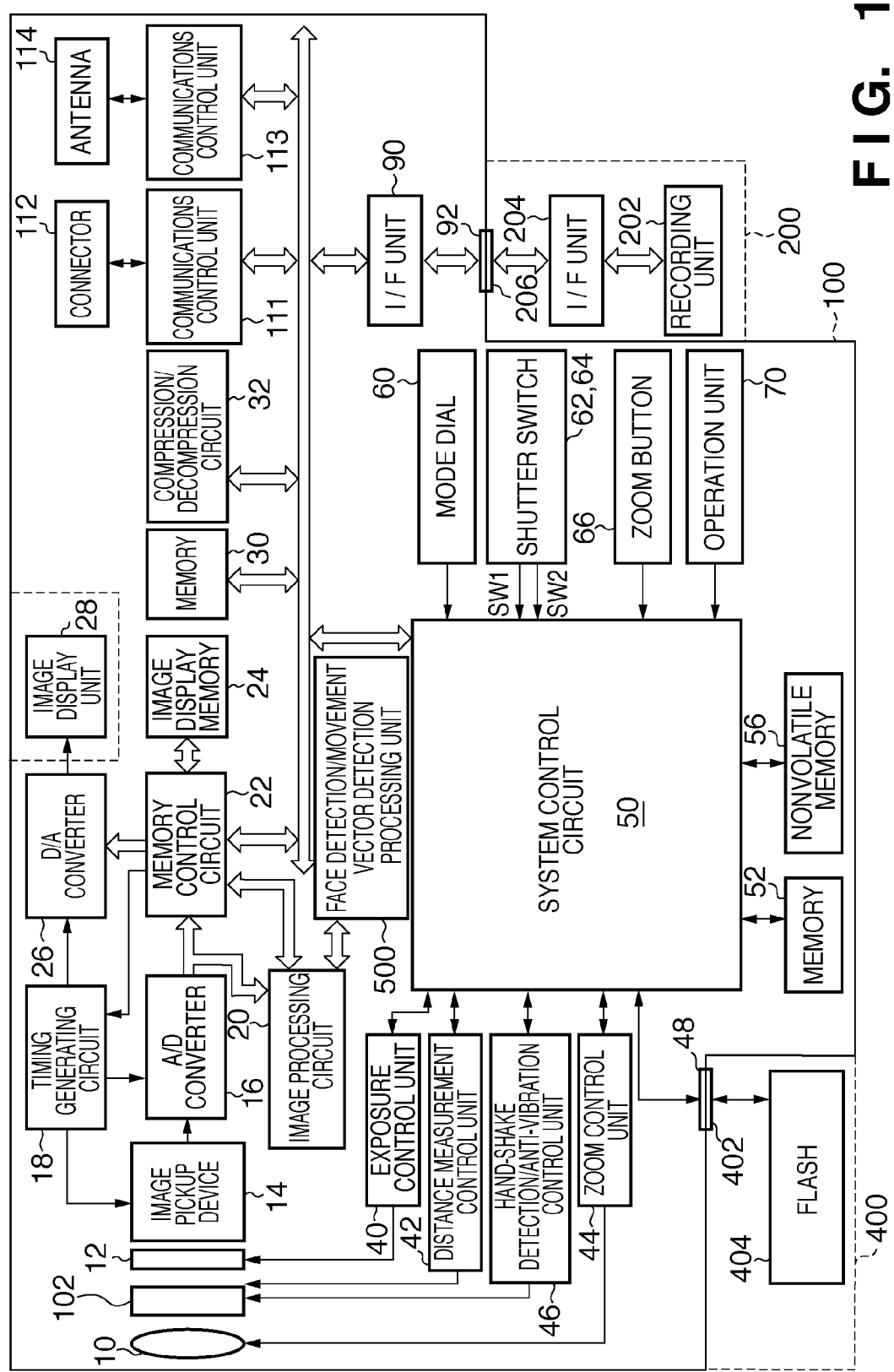
FIG. 1 shows the configuration of an image pickup apparatus according to the present embodiment.

FIG. 1 shows the configuration of an image pickup apparatus 100 according to the present embodiment. An image pickup lens 10 is an optical lens that forms a subject image on an image pickup device 14. A shutter 12 is provided with a stop function. The image pickup device 14 is a CCD or CMOS image sensor or the like, and photoelectrically converts the subject image that has been formed by the image pickup lens 10 to an electrical signal. An A/D converter 16 converts an analog signal output that is output from the image pickup device 14 to a digital signal. A timing generation circuit 18 supplies clock signals and control signals to the image pickup device 14, the A/D converter 16, and a D/A converter 26 under control by a memory control circuit 22 and a system control circuit 50.

An image processing circuit 20 performs predetermined pixel interpolation processing or color conversion processing on image data from the A/D converter 16 or image data from the memory control circuit 22. Also, in the image processing circuit 20, predetermined computational processing is performed using image data obtained by performing image pickup, and the obtained results of computation are output to the system control circuit 50. The system control circuit 50 performs control of an exposure control unit 40 and a distance measurement control unit 42, based on the results of computation using image data obtained by performing image pickup obtained from the image processing circuit 20. Specifically, the system control circuit 50 performs TTL (through-the-lens) AF (auto-focus) processing, AE (auto-exposure) processing, and flash pre-fire processing. The system control circuit 50 also performs TTL AWB (auto-white balance) processing, based on the results of computation using image data obtained by performing image pickup obtained from the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. For example, under control by the memory control circuit 22, data that has been output from the A/D converter 16 is written to the image display memory 24 or the memory 30 via the image processing circuit 20 and the memory control circuit 22. Alternatively, under control by the memory control circuit 22, data that has been output from the A/D converter 16 is written to the image display memory 24 or the memory 30 via only the memory control circuit 22.

The image display memory 24 is a memory where display image data for display in an image display unit 28 is temporarily stored. The D/A converter 26 converts a digital signal to an analog signal. The image display unit 28 is a TFT LCD (Thin Film Transistor Liquid Crystal Display) or the like. Image data for display that has been written to the image display memory 24 is displayed by the image display unit 28 via the D/A converter 26.

For example, by successively displaying image data obtained by successively performing image pickup with the image pickup device 14 as a moving image in real time in the image display unit 28, it is possible to realize an electronic viewfinder (EVF) function. Note that display by the image display unit 28 can be switched ON/OFF as desired by an instruction of the system control circuit 50.

Also, the image display unit 28 may be joined to the image pickup apparatus 100 by a rotatable hinge unit (not shown). In such a case, in the image pickup apparatus 100, by adjusting the angle of the hinge unit, it is possible to use the electronic viewfinder function, a playback/display function and various display functions in the image display unit 28 with a direction and angle freely set for the image display unit 28.

The memory 30 stores image data of still images, moving images, or the like obtained by performing image pickup. The memory 30 is provided with an amount of storage sufficient for storing a predetermined number of still images or moving images of a predetermined time length. Accordingly, in the image pickup apparatus 100, the memory 30 is also capable of storing images obtained by performing image pickup such as consecutive image pickup or panorama image pickup in which image pickup of a plurality of still images is performed consecutively. Also, the memory 30 is capable of being used as a work area of the system control circuit 50.

The compression/decompression circuit 32 compresses or decompresses image data by adaptive discrete cosine transform (ADCT) or the like. The compression/decompression circuit 32 reads image data that has been stored in the memory 30, performs compression processing or decompression processing, and again stores the processed data in the memory 30.

The exposure control unit 40 controls opening/closing of the shutter 12, provided with a stop function, and also has a function of modulating flash light in cooperation with a flash 404. The distance measurement control unit 42 controls focusing of the image pickup lens 10. The exposure control unit 40 and the distance measurement control unit 42 are controlled by the system control circuit 50 using a TTL system. Specifically, the system control circuit 50 controls the exposure control unit 40 and the distance measurement control unit 42 based on the results of computation performed by the image processing circuit 20 on image data obtained by performing image pickup.

A zoom control unit 44 controls zooming of the image pickup lens 10 under control by the system control circuit 50. A hand shake detection/anti-vibration control unit 46, under control by the system control circuit 50, detects movement of the image pickup apparatus 100 due to hand shake or the like, and also controls a hand shake correction mechanism 102 according to the detected movement. That is, in the image pickup apparatus 100, the hand shake detection/anti-vibration control unit 46 is a vibration detecting unit that detects movement of the image pickup apparatus 100. Detection of movement of the image pickup apparatus 100 by the hand shake detection/anti-vibration control unit 46 is performed based on an output value of a gyro sensor or acceleration sensor (neither shown) or the like provided within the apparatus.

A connector 48, also called an accessory shoe, provides both an electrical contact point with a flash apparatus 400 and a mechanical fixing unit therewith.

The system control circuit 50 controls the image pickup apparatus 100 as a whole. A memory 52 stores constants, variables, program code, and so forth for operation of the system control circuit 50.

A nonvolatile memory 56 is a memory capable of electrical erasing/recording under control by the system control circuit 50, and for example, an EEPROM (Electrically Erasable and Programmable ROM) or the like is used for that memory.

A mode dial 60, a shutter switch 62 (SW1), a shutter switch 64 (SW2), a zoom button 66, and an operation unit 70 are operating unit that receive an operation instruction from a user. These operating units are configured with a single switch, dial, touch panel, or the like, or a combination of a plurality thereof, and input various operating instructions received from the user to the system control circuit 50.

Here, the above operating unit will be specifically described. The mode dial 60 receives a switching instruction from the user to switch between the respective operating modes, such as power ON/OFF, an automatic image pickup mode, a manual image pickup mode, a panorama image pickup mode, a playback mode, a PC connection mode, and so forth.

The shutter switch 62 (SW1), by being switched ON while a shutter button (not shown) is being operated, receives an instruction from the user to start operation (image pickup preparatory operation) such as AF processing, AE processing, AWB processing, and flash pre-fire processing, and notifies the system control circuit 50 that such an instruction was received. The shutter switch 64 (SW2), by being switched ON when operation of the shutter button is complete, receives an instruction from the user to start a series of an image pickup operation, including exposure processing, development processing, and recording processing, and notifies the system control circuit 50 that such an instruction was received.

The exposure processing is processing in which, under control by the system control circuit 50, a signal that has been read out from the image pickup device 14 is written to the memory 30 as image data, via the A/D converter 16 and the memory control circuit 22. The development processing is processing in which, under control by the system control circuit 50, computation by the image processing circuit 20 and the memory control circuit 22 is performed on image data that has been written to the memory 30. The recording processing is processing in which, under control by the system control circuit 50, image data is read out from the memory 30 and compressed by the compression/decompression circuit 32, and then written to a recording medium 200.

The zoom button 66 includes respective buttons for instructing zooming between a wide-angle side and a telephoto side, and by these buttons being switched ON, a zooming instruction is given to the zoom control unit 44 via the system control circuit 50. A configuration may also be adopted in which, instead of the zoom button 66, a zoom ring is disposed on the circumference of a lens barrel, and an instruction to zoom to the wide-angle side or the telephoto side is given according to the direction of rotation of this zoom ring.

The operation unit 70 includes various buttons, a touch panel, or the like for receiving instructions from the user. For example, the operation unit 70 includes switches or the like that are capable of setting various function modes, such as a menu button, a set button, and a crisscross button. For example, when the user operates the set button, the image display unit 28 displays icons for changing a white balance mode, an exposure correction value, an image data compression ratio, an image data size, and so forth. By the user further selecting an icon that indicates a function of which settings the user wishes to change with the crisscross button, and changing settings values, it is possible to change the settings of the function indicated by that icon.

An I/F unit 90 is an interface for connecting with the recording medium 200. A connector 92 forms a connection with the aforementioned recording medium.

In the present embodiment, there is one system of an interface and connector where a recording medium is attached, but a configuration may also be adopted in which there is either one or a plurality of interfaces and connectors where a recording medium is attached. Also, a configuration may be adopted in which there is a combination of interfaces and connectors of different specifications.

The hand shake correction mechanism 102 drives a hand shake correction lens according to control by the hand shake detection/anti-vibration control unit 46. Specifically, the hand shake correction mechanism 102 drives a hand shake correction lens so as to cancel shaking of a subject image due to vibration of the image pickup apparatus 100, according to control by the hand shake detection/anti-vibration control unit 46.

A communications control unit 111, under control by the system control circuit 50, performs control of various communications functions, such as RS232C or USB, IEEE1394, P1284, SCSI, modem, LAN, or wireless communications. A connector 112, under control by the communications control unit 111, forms a wired connection by USB, IEEE1394, or the like with another device. An antenna 114, under control by a communications control unit 113, connects with another device by wireless communications via wireless LAN communications according to IEEE802.11b, IEEE802.11g, or the like, wireless communications by spread spectrum communications such as Bluetooth, or infrared communications such as IrDA, or the like.

The recording medium 200 is a memory card, a hard disk drive, or the like. Specifically, the recording medium 200 is provided with a recording unit 202 constituted from a semiconductor memory, magnetic disk, or the like, an I/F unit 204 for connecting with the image pickup apparatus 100, and a connector 206.

The flash apparatus 400 is provided with a connector 402 and the flash 404. The connector 402 connects to the connector 48, which is an accessory shoe of the image pickup apparatus 100 as mentioned above. The flash 404, under control by the system control circuit 50 to which the flash 404 is connected via the connectors 402 and 48, fires supplemental light at a subject. Under control by the system control circuit 50, the flash 404 may also have a function of firing AF supplemental light, and a function of modulating the flash light.

A face detection/movement vector detection processing unit 500 serving as a movement detection unit detects human faces and a movement vector that indicates the movement of a subject between images from the results of image processing. Commonly known technology can be applied as the method for human face detection in the face detection/movement vector detection processing unit 500, and this method is not directly related to the present invention so a detailed description thereof is omitted. Commonly known face detection technology includes schemes based on learning employing a neural network or the like, and schemes in which template matching is used to search in an image for portions where shape is a distinguishing feature, such as eyes, nose, and mouth, and portions with high similarity are considered to be a face. In addition, many schemes have been proposed in which an amount of image features such as skin color or eye shape is detected, and statistical analysis is used. Ordinarily, the accuracy of face detection is improved by combining a plurality of these schemes. For example, there are schemes in which face detection is performed using wavelet conversion and an image feature amount, one specific example being the scheme disclosed in Japanese Patent Laid-Open No. 2002-251380. The movement vector detection method in the face detection/movement vector detection processing unit 500 will be described later.

Figure 2:
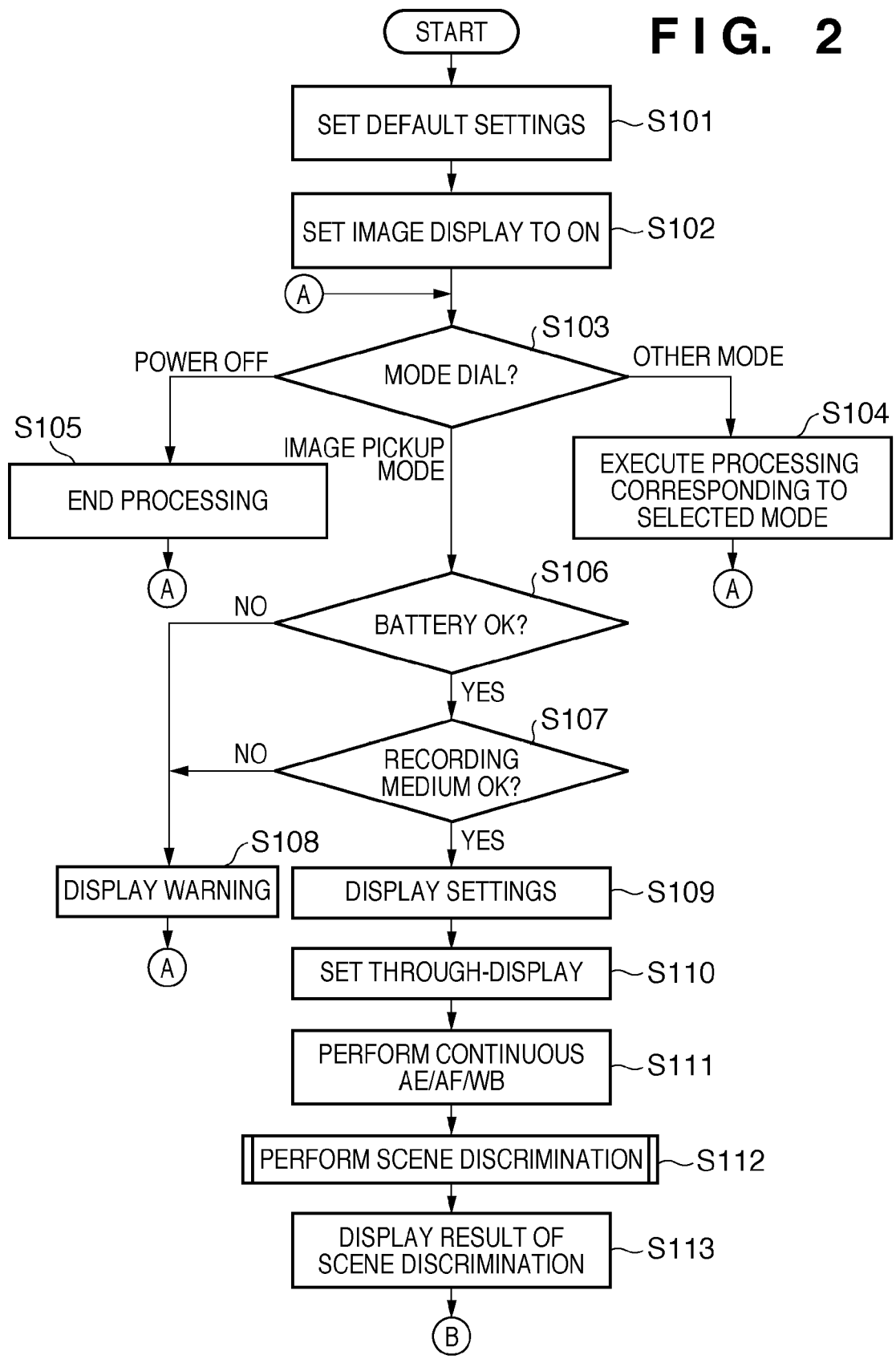
FIG. 2 is a flowchart that shows a main routine of operation of the image pickup apparatus according to the present embodiment.
Figure 3:
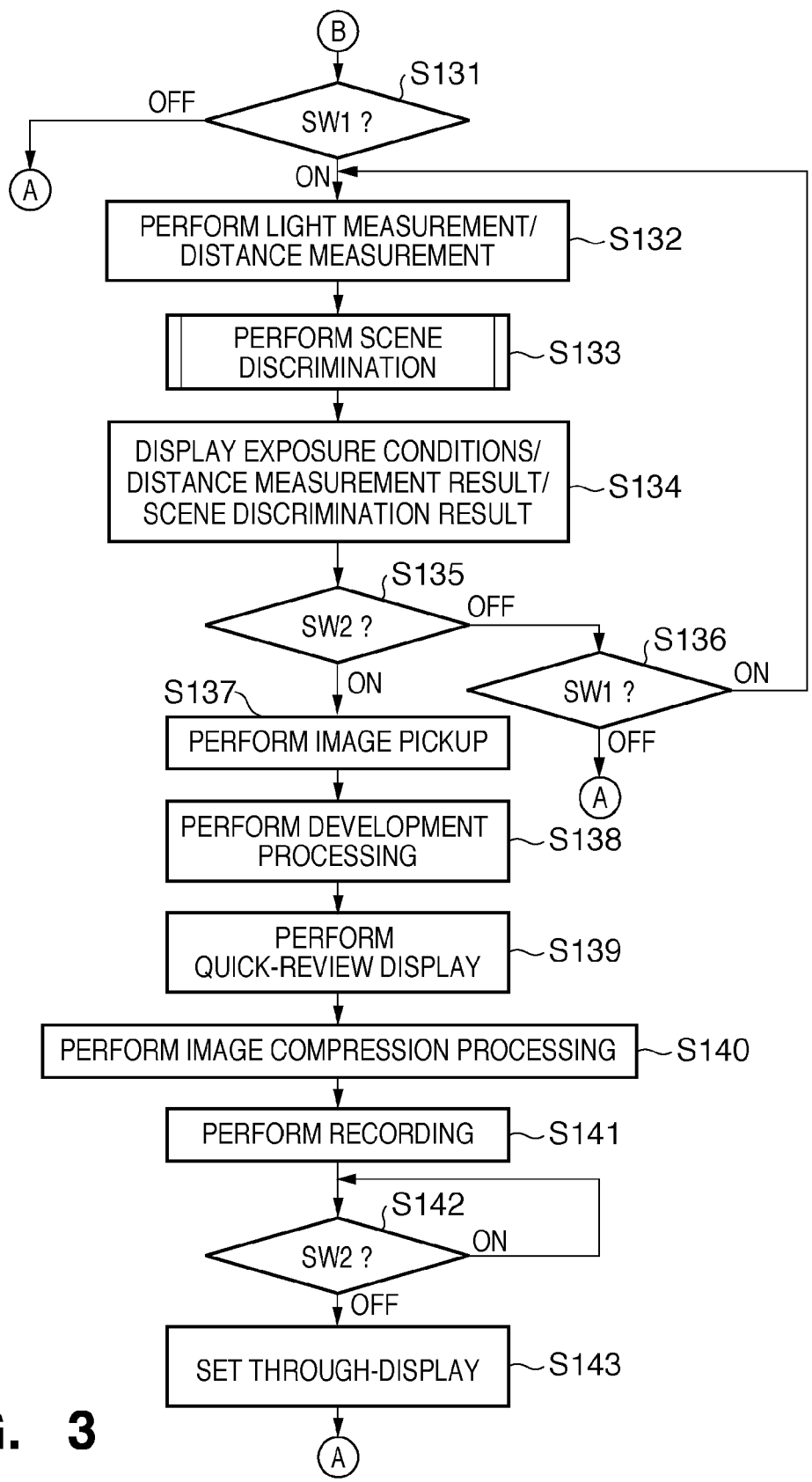
FIG. 3 is a flowchart that shows a main routine of operation of the image pickup apparatus according to the present embodiment.

Next is a description of operation of the present embodiment performed by the image pickup apparatus 100 under control by the system control circuit 50, with reference to FIGS. 2 to 4. FIGS. 2 and 3 are flowcharts that show a main routine of operation of the image pickup apparatus 100. First, the main routine of operation of the image pickup apparatus 100 will be described with reference to FIGS. 2 and 3.

As shown in FIG. 2, for example, by applying power, the system control circuit 50 sets default settings to initialize flags and control variables (step S101), and sets display of the image display unit 28 to the default setting of an ON state (step S102).

Next, the system control circuit 50 determines the set position of the mode dial 60 (step S103). If the mode dial 60 has been set to power OFF, the system control circuit 50 changes display of the image display unit 28 to an end state, and performs predetermined end processing such as cutting off unnecessary power supply to parts of the image pickup apparatus 100, including the image display unit 28 (step S105). After the end processing, processing returns to step S103.

If the mode dial 60 has been set to the image pickup mode, the system control circuit 50 proceeds to the processing of step S106. Also, if the mode dial 60 has been set to a mode other than the image pickup mode, the system control circuit 50 executes processing corresponding to the selected mode (step S104), and after that processing, returns to step S103.

In step S106, the system control circuit 50 determines whether or not a remaining battery amount or operating circumstances will be a problem for operation of the image pickup apparatus 100. When there is a problem in step S106, the system control circuit 50 uses the image display unit 28 to display a predetermined warning by an image (step S108), and then returns to step S103.

When there is not a problem in step S106, the system control circuit 50 determines whether or not the operating state of the recording medium 200 will be a problem for operation of the image pickup apparatus 100, in particular an operation of recording/playback of image data to/from the recording medium (step S107). When there is a problem in step S107, the system control circuit 50 uses the image display unit 28 to display a predetermined warning by an image (step S108), and then returns to step S103. When there is not a problem in step S107, the system control circuit 50 proceeds to the processing of step S109.

In step S109, the system control circuit 50 uses the image display unit 28 to display the state of various settings of the image pickup apparatus 100 by an image.

Next, the system control circuit 50 sets a through-display state in which image data obtained by performing image pickup with the image pickup device 14 is successively displayed in the image display unit 28 as a moving image (step S110). In the through-display state, image data that has been successively written to the image display memory 24 via the shutter 12, the A/D converter 16, the image processing circuit 20, and the memory control circuit 22 is successively displayed in the image display unit 28 via the memory control circuit 22 and the D/A converter 26. That is, in the through-display state, an electronic viewfinder display function is realized.

In step S111, the system control circuit 50, in order to make through-images displayed in the image display unit 28 in the through-display state appropriate, continuously performs light measurement, distance measurement, and color capture, and performs AE processing, AF processing, and AWB processing corresponding to the results thereof on the through-images.

Next, the system control circuit 50 performs scene discrimination processing in which an image pickup scene is discriminated from image data obtained by performing image pickup for through-image display, and hand shake information of the image pickup apparatus 100 (vibration detection results that indicate movement of the image pickup apparatus 100) detected by the hand shake detection/anti-vibration control unit 46 (step S112). Next, the system control circuit 50 displays the result of the scene discrimination processing in the image display unit 28 (step S113). Details of the scene discrimination processing will be described later.

Next, the system control circuit 50, as shown in FIG. 3, determines ON/OFF of the shutter switch 62 (SW1) (step S131). When the SW1 is OFF in step S131, the system control circuit 50 returns to the processing of step S103.

When the SW1 is ON in step S131, the system control circuit 50 performs distance measurement processing to focus the image pickup lens 10 on the subject, and performs light measurement processing to determine a stop value, a shutter time, and so forth (step S132). If necessary in the light measurement processing, flash settings are also performed.

Next, the system control circuit 50 performs scene discrimination processing in which an image pickup scene is discriminated from image data obtained by performing image pickup for through-image display, and hand shake information of the image pickup apparatus 100 detected by the hand shake detection/anti-vibration control unit 46 (step S133). Next, the system control circuit 50 displays exposure conditions that have been fixed for still image pickup, the result of distance measurement, and the result of scene discrimination in the image display unit 28 (step S134). Here, the exposure conditions that have been set for still image pickup are decided based on the results of light measurement, distance measurement, and scene discrimination.

Next, the system control circuit 50 determines ON/OFF of the shutter switch 64 (SW2) (step S135). When the SW2 is OFF in step S135, the system control circuit 50 determines ON/OFF of the SW1 (step S136). The system control circuit 50, when ON of the SW1 is being maintained in step S136, returns to the processing of step S132, and when the SW1 is OFF in step S136, returns to the processing of step S103.

Also, when the SW2 is ON in step S135, the system control circuit 50 executes a series of image pickup processing including exposure processing and development processing (step S137). Specifically, in the exposure processing, the system control circuit 50 writes image data obtained by performing image pickup to the memory 30, via the image pickup device 14, the A/D converter 16, the image processing circuit 20, and the memory control circuit 22, or via the memory control circuit 22 from the A/D converter 16. In the development processing, the system control circuit 50 performs various computational processing using the memory control circuit 22 and as necessary the image processing circuit 20, on image data that has been written to the memory 30.

Next, the system control circuit 50, via the memory control circuit 22, reads out a portion of the image data that has been written to a predetermined area of the memory 30 in step S137, and performs WB (white balance) integral computation processing and OB (optical black) integral computation processing necessary for performing the development processing. The results of this computation are stored in an internal memory of the system control circuit 50 or in the memory 52.

Next, the system control circuit 50 reads out the image data that has been written to the predetermined area of the memory 30, and performs various development processing using the computational results stated above, including AWB processing, gamma conversion processing, and color conversion processing (step S138). The image data that has been processed here is again written to the predetermined area of the memory 30.

Next, the system control circuit 50 performs a quick-review display in which an image after development processing in step S138 is displayed by the image display unit 28 (step S139). Specifically, the system control circuit 50 reads out the image data from the memory 30, performs processing to adapt that image data to the display format of the image display unit 28, and forwards image data for display to the image display memory 24 via the memory control circuit 22. Next, the image data for display is read out from the image display memory 24 and displayed in the image display unit 28.

Next, the system control circuit 50 reads out the image data that has been written to the predetermined area of the memory 30, and image compression processing according to the set mode is performed by the compression/decompression circuit 32 (step S140). After step S140, image data that has been obtained by performing image pickup and has undergone a series of processing is written to an empty portion of an image storage buffer area of the memory 30.

Next, the system control circuit 50 performs recording processing in which the image data that has been written to the image storage buffer area of the memory 30 is read out, and that image data is written to the recording medium 200 via the I/F unit and the connector (step S141). Also, while the image data is being written to the recording medium 200, in order to make it clear that a write operation is being performed, for example, an indication such as a blinking LED, not shown in the drawings, may be given.

Next, the system control circuit 50 determines ON/OFF of the shutter switch 64 (SW2) (step S142). In step S142, processing is in a standby state when the SW2 is ON, and processing proceeds to step S143 when the SW2 is OFF. Alternatively, in step S142, when in a continuous image pickup mode, the processing returns to step S137, although not shown in FIG. 3. Thus, while the SW2 is ON, the processing of steps S137 to S141 is continuously performed, so that continuous image pickup is realized.

In step S143, the system control circuit 50 sets the display state of the image display unit 28 to the through-display state, and after a series of image pickup operation, returns to the processing of step S103.

Figure 4A:
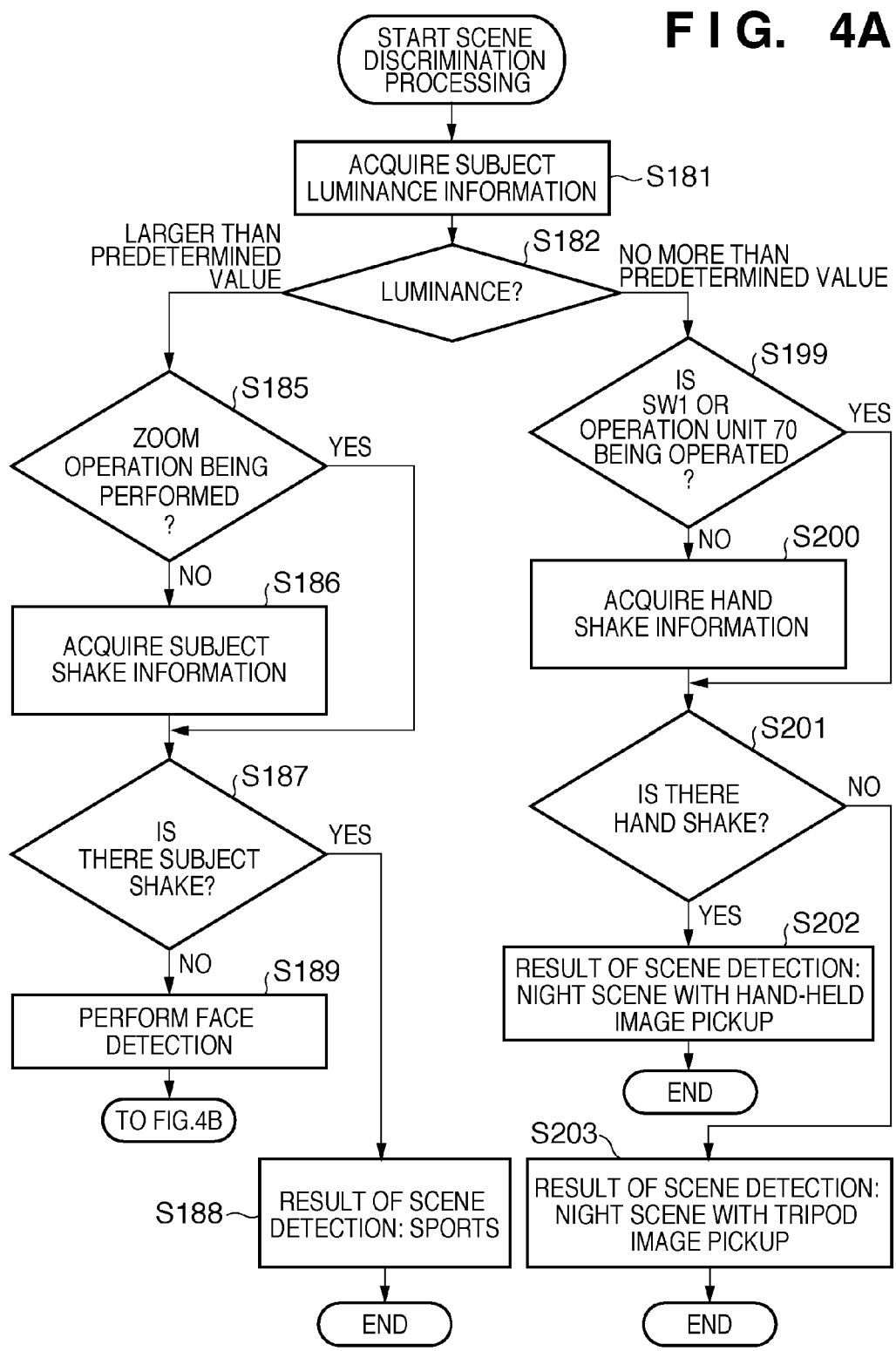

Next, the algorithm for scene discrimination processing (steps S112 and S133) of the image pickup apparatus 100 will be described with reference to FIGS. 4A and 4B. FIGS. 4A and 4B are flowcharts that show the scene discrimination processing algorithm.

As shown in FIGS. 4A and 4B, when the scene discrimination processing is started, the system control circuit 50 acquires a subject luminance (luminance value of the subject) from an image obtained by performing image pickup with the image pickup device 14 (step S181). That is, in the image pickup apparatus 100, in step S181, luminance detection in which a luminance value of the subject is detected is performed by the system control circuit 50. Next, the system control circuit 50 determines whether or not the acquired subject luminance is not more than a predetermined value that has been set in advance in a memory or the like (step S182). Here, luminance information acquired in the past in light measurement processing may be used as the subject luminance.

When the subject luminance is greater than the predetermined value in step S182, the system control circuit 50 determines whether or not the zoom button 66 is being operated, that is, whether or not a field of view adjustment instruction is being received from the user (step S185). Next, if the zoom button 66 is not being operated (step S185:NO), the system control circuit 50 acquires subject shake information from the results of detection (movement detection results that indicate movement of the subject) by the face detection/movement vector detection processing unit 500 (step S186). Conversely, if the zoom button 66 is being operated (step S185:YES), the system control circuit 50 proceeds to the next processing step (step S187), without acquiring subject shake information.

Two frame images that are sequential in time are compared, and from information of the difference between those two frame images, a movement vector is detected. Specifically, a block constituted from a plurality of pixels is matched with surrounding blocks in the image of the next frame, and the positional relationship with the matched blocks is output as a movement vector. Among movement vectors in one image during a particular amount of time, it is possible to discriminate a vector with comparatively little movement and whose direction is uniform as a background image, and a vector with much movement and whose direction is not uniform as a moving subject. Also, by subtracting the amount of hand shake obtained by the hand shake detection/anti-vibration control unit 46 from the movement vector of a subject, it is possible to calculate movement of the subject, and this movement is used as subject shake information.

In step S185, a determination is made of whether or not the zoom button 66 is being operated, but a determination may also be made of whether or not the present time is within a certain fixed time after operation of the zoom button 66. Thus, an algorithm that does not acquire subject shake information may be continuously used while operation of the zoom button 66 is being received, or until a predetermined period of time passes after receiving of operation of the zoom button 66 has ended. By performing such processing, in the image pickup apparatus 100, it is possible to suppress effects on the subject shake information due to variations in the angle of view due to operation of the zoom button 66, and thus possible to avoid scene detection errors. When using an algorithm in which subject shake information is not acquired, in the scene discrimination thereafter, discrimination is performed using subject shake information that was acquired in the past, or discrimination is performed with the assumption that there is no subject shake.

Next, the system control circuit 50 determines whether or not there is subject shake from the acquired subject shake information (step S187), determines the result of scene detection to be a sports scene when there is subject shake (step S188), and ends scene discrimination processing. When there is no subject shake in step S187, the system control circuit 50 performs face detection processing by the face detection/movement vector detection processing unit 500 (step S189).

Next, the system control circuit 50 determines whether or not the size of a face detected in step S189 is at least a predetermined size value (step S190). When a face is detected, and the size of that detected face is at least the predetermined value, the system control circuit 50 determines the result of scene detection to be a portrait scene (step S191), and ends scene discrimination processing.

When a face with a size of at least the predetermined value is not detected in step S190, the system control circuit 50 performs distance measurement processing in which subject distance information is acquired that indicates the distance between the main subject and the image pickup apparatus 100 (step S192). Specifically, in the distance measurement processing, subject distance information is acquired by a hill climbing algorithm or phase difference sensor (not shown) using an image obtained by performing image pickup with the image pickup device 14. Next, the system control circuit 50 determines the distance from the main subject from the acquired subject distance information (step S193). Here, subject distance information that was acquired in past distance measurement processing may also be used.

When the distance from the main subject is not more than a predetermined value in step S193, the system control circuit 50 determines the result of scene detection to be a macro scene (step S198), and ends scene discrimination processing.

When the distance from the main subject is infinite in step S193, the system control circuit 50 acquires color information from the image obtained by performing image pickup (step S195), and determines whether or not sky is included in the subject based on the acquired color information (step S196). When sky is included in step S196, the system control circuit 50 determines the result of scene detection to be a landscape scene (step S197), and ends scene discrimination processing.

When the distance from the main subject in step S193 is neither infinite nor less than the predetermined value, but another value, or when sky is not included in step S196, the system control circuit 50 determines that the result of scene detection is an ordinary scene (step S194), and ends scene discrimination processing.

The system control circuit 50, when the result of scene detection has been discriminated to be a sports scene, by setting a shorter exposure time when performing image pickup than when an ordinary scene has been discriminated, makes shaking of the subject image less likely. Also, the system control circuit 50, when the result of scene detection has been discriminated to be a portrait scene, by setting a larger stop opening diameter when performing image pickup than when an ordinary scene has been discriminated, causes the image processing circuit 20 to perform color processing such that the color of human skin is closer to an ideal skin color when an image is developed. Also, the system control circuit 50, when the result of scene detection has been discriminated to be a macro scene, sets the stop opening diameter to a smaller diameter than the settable range when an ordinary scene has been discriminated. Also, the system control circuit 50, when the result of scene detection has been discriminated to be a landscape scene, by setting a smaller stop opening diameter when performing image pickup than when an ordinary scene has been discriminated, causes the image processing circuit 20 to perform color processing such that the color saturation of image data is strengthened when an image is developed. In this way, the system control circuit 50 changes the control parameters in exposure processing and development processing according to the result of scene detection.

Returning to step S182, when the subject luminance is not more than a predetermined value, the system control circuit 50 determines whether or not the SW1 or the operation unit 70 is being operated. That is, the system control circuit 50 determines whether or not the SW1 or the operation unit 70 is being operated, and operation of the SW1 or the operation unit 70 is presently being received (step S199). Also, in step S199 a determination may be made of whether or not a predetermined period of time has passed after receiving of operation of the SW1 or the operation unit 70 has ended. Moreover, this determination need not be limited to the SW1 and the operation unit 70; the system control circuit 50 may also determine whether or not the zoom button 66 is being operated.

If the SW1 or the operation unit 70 is not being operated in step S199, the system control circuit 50 acquires hand shake information from the hand shake detection/anti-vibration control unit 46 (step S200). Conversely, if the SW1 or the operation unit 70 is being operated, the system control circuit 50, without acquiring hand shake information, proceeds to the next step of processing (step S201). By performing the above-described processing, in the image pickup apparatus 100, it is possible to suppress effects on the hand shake information due to operation of the SW1 or the operation unit 70, and thus possible to avoid scene detection errors. When using an algorithm in which hand shake information is not acquired, in the scene discrimination thereafter, discrimination is performed using hand shake information that was acquired in the past, or discrimination is performed with the assumption that there is no hand shake.

Next, whether or not hand shake is present is determined from the acquired hand shake information (step S201). When there is no hand shake in step S201, the system control circuit 50 determines that the result of scene detection is a night scene with tripod image pickup (step S203), and ends scene discrimination processing. When there is hand shake in step S201, the system control circuit 50 determines that the result of scene detection is a night scene with hand-held image pickup (step S202), and ends scene discrimination processing.

When the system control circuit 50 has discriminated that the result of scene detection is a night scene with tripod image pickup, the system control circuit 50 sets the sensitivity of the image pickup device 14 to a minimum value, and performs exposure for a long period of time. When the system control circuit 50 has discriminated that the result of scene detection is a night scene with hand-held image pickup, the system control circuit 50 sets a maximum for the exposure time, and then performs exposure with the sensitivity of the image pickup device 14 increased by only as much as necessary.

In this way, an algorithm is continuously used that does not utilize hand shake information in a state in which the reliability of hand shake information is reduced by operation of the SW1 or the operation unit 70, while operation of the SW1 or the operation unit 70 is being received or until a predetermined period of time passes after receiving of such operation has ended. Therefore, it is possible to avoid scene detection errors in the image pickup apparatus 100. Of course, scene discrimination processing may likewise be performed using an algorithm that does not utilize hand shake information not only in the case of operation of the SW1 or the operation unit 70, but also when a zoom operation has been performed.

Above, scene discrimination processing in the present embodiment is described. Herein, an example of the SW1 and zoom operation is described, but of course operation of another operational member may also be utilized in the scene discrimination processing. Also, there is no limitation to operation of a member provided in the image pickup apparatus 100; in a configuration having a user interface that invokes a function by imparting movement to the body of the image pickup apparatus 100, operation by the user to impart movement to the body may be utilized. That is, a configuration may be adopted in which, when a function of the above user interface has been started by the user imparting movement to the image pickup apparatus 100, hand shake information or subject shake information are not used for scene discrimination at the time of detection of that movement.

Also, in the present embodiment, a configuration is adopted in which, while operation by the user is being received or until a predetermined period of time passes after receiving of such operation has ended, by not allowing acquisition of one of the hand shake information and the subject shake information, the information used for scene discrimination is restricted such that one of those units of information does not contribute at all to scene discrimination. However, a configuration may also be adopted in which hand shake information and subject shake information are always acquired, and while operation by the user is being received or until a predetermined period of time passes after receiving of such operation has ended, the degree to which one of the units of acquired information contributes to scene discrimination is changed in the direction restricting the contribution of that information. Specifically, weighting may be set such that, while operation by the user is being received or until a predetermined period of time passes after receiving of such operation has ended, one of the hand shake information and the subject shake information does not contribute to scene discrimination.

Also, hand shake information and subject shake information are the same with respect to the point that reliability decreases due to operation by the user. Therefore, a configuration may also be adopted in which, while operation by the user is being received or until a predetermined period of time passes after receiving of such operation has ended, rather than selecting one of hand shake information and subject shake information for scene discrimination processing, neither kind of information is ever acquired.

Also, in the above description both a configuration whereby hand shake information is not acquired and a configuration whereby subject shake information is not acquired, while operation by the user is being received or until a predetermined period of time passes after receiving of such operation has ended, are provided, but this is not a limitation. In the case of an image pickup apparatus that is provided with a function to detect a movement vector, but is not provided with a gyro sensor or acceleration sensor, a configuration may be adopted in which, while operation by the user is being received or until a predetermined period of time passes after receiving of such operation has ended, only subject shake information is not acquired. Alternatively, in the case of an image pickup apparatus that is provided with a gyro sensor or acceleration sensor, but is not provided with a function to detect a movement vector, a configuration may be adopted in which, while operation by the user is being received or until a predetermined period of time passes after receiving of such operation has ended, only hand shake information is not acquired.

The recording medium 200 may of course also be comprised of a micro-DAT, a magneto-optical disk, an optical disk such as a CD-R or CD-WR, a phase change optical disk such as a DVD, or the like. Furthermore, the recording medium 200 may of course also be multimedia in which a memory card, a hard disk, and so forth are integrated. Moreover, part of that multimedia may of course be removable.

In the description of the present embodiment, the recording medium 200 is separate from the image pickup apparatus 100, and can be connected as desired, but any or all recording media may of course also be fixed to the image pickup apparatus 100. Also, the image pickup apparatus 100 may be configured so that a plurality of a desired number of recording media 200 can be connected. Also, a configuration was described in which the recording medium 200 is mounted to the image pickup apparatus 100, but of course a configuration may also be adopted in which there is a single recording medium or a combination of any of a plurality of recording media.

Also, in the above description, the flash apparatus 400 is separate from the image pickup apparatus 100, and can be connected as desired, but the flash apparatus 400 may of course also be fixed to the image pickup apparatus 100. Moreover, a configuration may also be adopted in which a plurality of flash apparatuses 400 are individually connectable to the image pickup apparatus 100, and a configuration may be adopted in which those flash apparatuses are fixed to the image pickup apparatus 100.

Figure 5:
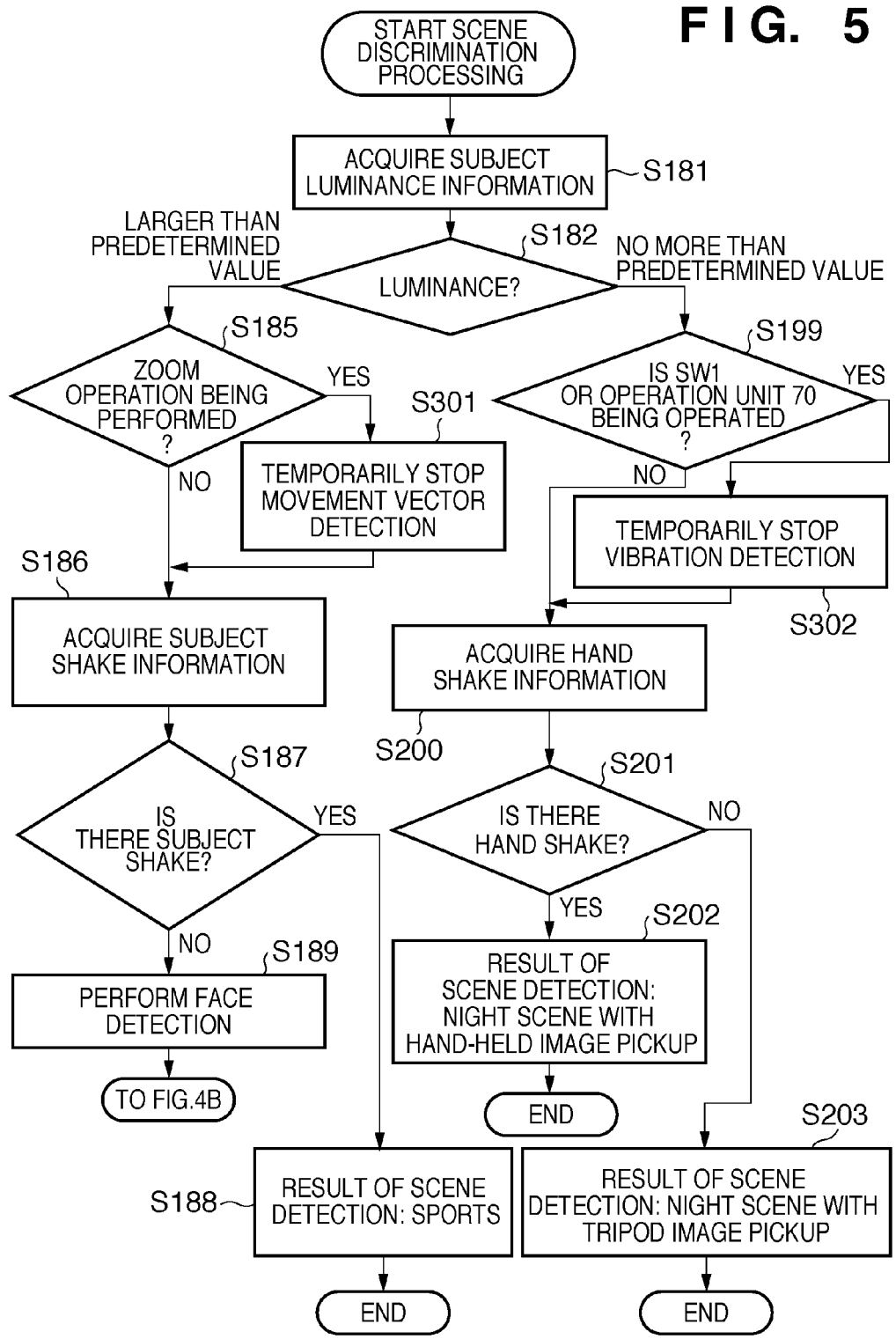
FIG. 5 is a flowchart that shows another algorithm of scene discrimination processing.

Next, another algorithm for scene discrimination processing (steps S112 and S133) of the image pickup apparatus 100 will be described with reference to FIG. 5. FIG. 5 is a flowchart that shows an algorithm for scene discrimination processing. In this flowchart, the same processing as in the flowcharts in FIG. 4A is denoted by the same numbers, and below the processing that differs from the flowchart in FIG. 4A will be described.

In the flowchart in FIG. 4A, when any of the zoom button 66, the shutter switch 62 (SW1), and the operation unit 70 is operated, acquisition of subject shake information is restricted, or acquisition of hand shake information is restricted. On the other hand, in the flowchart in FIG. 5, when the zoom button 66 is operated, the face detection/movement vector detection processing unit 500 temporarily stops detection of a movement vector. Moreover, when the SW1 or the operation unit 70 is operated, the hand shake detection/anti-vibration control unit 46 temporarily stops detection of movement (vibration) of the image pickup apparatus.

As shown in FIG. 5, in step S185, the system control circuit 50 determines whether or not the zoom button 66 is being operated, that is, determines whether or not a field of view adjustment instruction is being received from the user.

If the zoom button 66 is not being operated, the system control circuit 50 acquires subject shake information from the results of detection by the presently operating face detection/movement vector detection processing unit 500 (movement detection results that indicate movement of the subject) (step S186).

Conversely, if the zoom button 66 is being operated, the system control circuit 50 temporarily stops movement vector detection by the face detection/movement vector detection processing unit 500 (step S301). By performing such processing, in the image pickup apparatus 100, it is possible to suppress effects on the subject shake information due to operation of the zoom button 66, and it is thus possible to avoid scene detection errors. When movement vector detection by the face detection/movement vector detection processing unit 500 has been temporarily stopped, in step S186, the system control circuit 50 acquires a discrimination result that there is no subject shake from the face detection/movement vector detection processing unit 500.

Also, in step S199, the system control circuit 50 determines whether or not the SW1 or the operation unit 70 is being operated.

If the SW1 or the operation unit 70 is not being operated, the system control circuit 50 acquires hand shake information from the results of detection by the presently operating hand shake detection/anti-vibration control unit 46 (step S200).

Conversely, if the SW1 or the operation unit 70 is being operated, the system control circuit 50 temporarily stops detection of movement (vibration) of the image pickup apparatus by the hand shake detection/anti-vibration control unit 46 (step S302). By performing this sort of processing, in the image pickup apparatus 100, it is possible to suppress effects on the hand shake information due to operation of the hand shake detection/anti-vibration control unit 46, and thus it is possible to avoid scene detection errors. When detection of movement of the image pickup apparatus by the hand shake detection/anti-vibration control unit 46 has been temporarily stopped, in step S200, the system control circuit 50 acquires a discrimination result that there is no hand shake from the hand shake detection/anti-vibration control unit 46.

In this way, according to the flowchart shown in FIG. 5, when any of the zoom button 66, the SW1, and the operation unit 70 is operated, the detection operation of the face detection/movement vector detection processing unit 500 or the hand shake detection/anti-vibration control unit 46 is temporarily stopped. Therefore, it is possible to suppress the effects on subject shake information or hand shake information due to operation of these units.

The descriptions in the above embodiment are given only by way of example, and are not limitations. The configuration and operation of the above embodiment can be appropriately modified.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-020741, filed on Jan. 30, 2009, and 2009-291407, filed on Dec. 22, 2009, which are hereby incorporated by reference herein in their entirety.

What is claimed is:

1. An image pickup apparatus, comprising:
   an image pickup unit configured to pick up an image of a subject;
   a detection unit that comprises at least one of a movement detection unit that detects movement of the subject from images that have been picked up by the image pickup unit and a shake detection unit that detects shake of the image pickup apparatus;
   a scene discrimination unit configured to perform scene discrimination based on: information that includes the results of detection by the detection unit, and an image that has been picked up by the image pickup unit; and
   an operating member configured to be operated by a user;
   wherein the scene discrimination unit is configured:
   to repeat, until the operating member is operated by the user, an operation of acquiring the results of detection from the detection unit and performing the scene discrimination based on the picked-up image and the acquired results of detection;
   to perform, while the operating member is being operated by the user, the scene discrimination based on the picked-up image and the results of detection acquired before the operating member is operated by the user; and
   to perform, when the user's operation of the operating member has ended, the scene discrimination based on the picked-up image and the results of detection acquired after the user's operation of the operating member has ended.

2. The image pickup apparatus according to claim 1, wherein the scene discrimination unit is configured to perform, until a predetermined period of time passes after the user's operation of the operating member has ended, the scene discrimination based on the picked-up image and the results of detection acquired before the operating member is operated by the user.

3. The image pickup apparatus according to claim 1, wherein the operating member is configured to be operated by the user to adjust the field of view of the image pickup unit.

4. The image pickup apparatus according to claim 1, wherein while the operating member is being operated, the detection unit is configured not to detect at least one of movement of the subject and shake of the image pickup apparatus.

5. A method for controlling an image pickup apparatus having an image pickup unit that picks up an image of a subject and an operating member configured to be operated by a user, the method comprising:
   a detection step that comprises at least one of a movement detection step of detecting movement of the subject from images that have been picked up by the image pickup unit and a shake detection step of detecting shake of the image pickup apparatus; and
   a scene discrimination step of performing scene discrimination based on information that includes the results of detection from the detection step, and an image that has been picked up by the image pickup unit;
   wherein the scene discrimination step comprises:
   repeating, until the operating member is operated by the user, an operation of acquiring the results of detection from the detection step and performing the scene discrimination based on the picked-up image and the acquired results of detection;
   performing, while the operating member is being operated by the user, the scene discrimination based on the picked-up image and the results of detection acquired before the operating member is operated by the user; and
   performing when the user's operation of the operation member has ended the scene discrimination based on the picked-up image and the results of detection acquired after the user's operation of the operating member has ended.

6. The image pickup apparatus according to claim 1, wherein the operating member is a shutter button.

* * * * *